United States Patent Office 3,238,989
Patented Mar. 8, 1966

3,238,989
MOVING-ARM MACHINE FOR THE RAPID REMOVAL OF TIRES FROM THEIR RIMS
Mario Silvestrani, Via Roma 14, Fermo, Italy
Filed Nov. 24, 1964, Ser. No. 413,448
Claims priority, application Italy, Jan. 7, 1964, 241/64
4 Claims. (Cl. 157—1.24)

The object of the present invention is a moving-arm machine for the rapid removal of tires from their rims, characterised by the fact of having a gripping-platform for rotating the rims consisting of three superimposed co-axial plates, namely the top plate provided with three bars, pinned into it and shaped to as to grip the rim, a middle plate fitted with three pairs of rollers which, by the relative movement of the plates, cause the bars to rotate, and the lowest plate which is a clutch-plate integrated with the machine and brings about, via the rotation of the topmost plate, the gripping of a rim laid on the platform and the immediate rotation of the rim itself when the gripping is completed.

In order that the invention may be clearly understood one embodiment thereof will now be described with reference to the accompanying drawing, in which.

Figure 1:
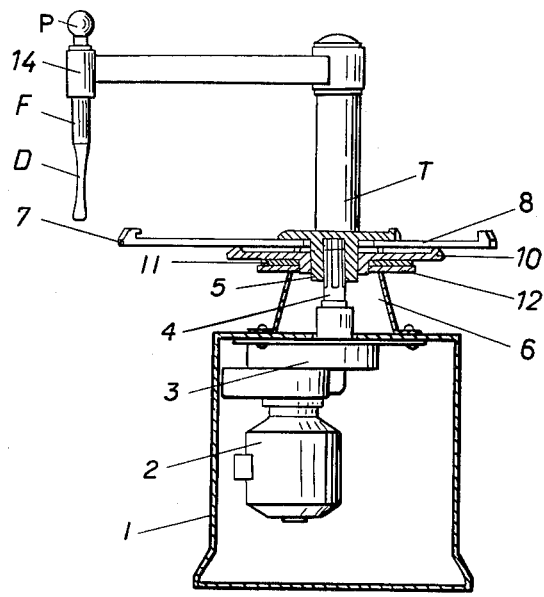
FIG. 1 is an axial vertical section taken along the line L—M of FIG. 2.
Figure 2:
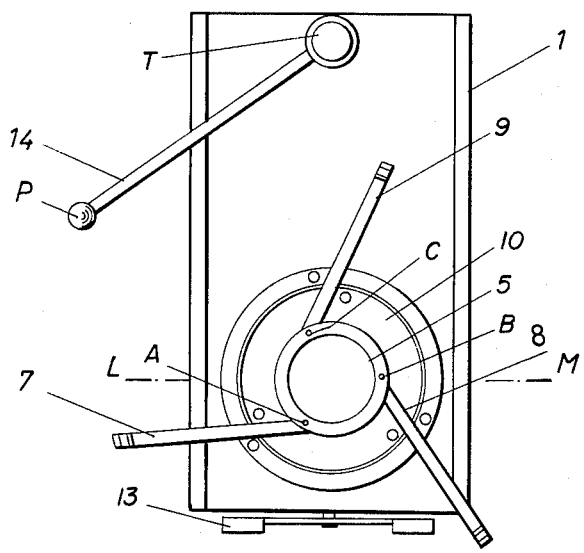
FIG. 2 is a plan view.

As shown a metal housing 1 encloses an electric motor 2 coupled to a speed-reducer 3, the vertical splined shaft 4 of which is slotted into the grooved hole of the top plate 5 of the gripping platform 6.

This platform 6, a special feature of the machine, serves to fix the rim, whether carrying a tire or not, on to the machine. The platform 6 is made up of an upper plate which carries three identical bars 7, 8 and 9, pinned to the underside of the said plate.

The said bars, being able to swivel around their respective pins A, B and C, can take up different positions so as to finish in either a radial or a tangential setting. The free end of each bar is shaped as a hook to grip the rims of tire-bearing wheels. Under the plate 5 there is another co-axial plate 10 which has, in its upper face, three pairs of pins with rollers. Each bar moves between its two adjacent rollers. Under the plate 10 there is a clutch-plate 11; fixed on to the flange 12 which forms part of the machine-housing. The top plate 5, which can slide axially on the splined shaft 4, is set on the middle plate 10 and this in its turn rests on the clutch-plate 11 together with the flange 12 which is set in the machine-housing. When a rim, with or without a tire, is placed on the gripping platform 6 and when the plate 5 is made to rotate counter clockwise by means of the forward reverse switch 13, the following takes place: the weight of the rim and of the plate 5 is taken by the flange 12 through the agency of the middle plate 10. The top plate 5 acts upon the middle plate 10 with a slight torque action. Since the flange 12 and the clutch-plate act upon the middle plate 10 with a torque action equal and opposite to that just mentioned, the result is that the top plate 5 turns while the middle plate 10 remains still. The bars 7, 8 and 9, drawn by the plate 5, revolve around their pins. The ends of the bars now move in ever-decreasing circles until they meet the edge of the rim. At this point gripping of the rim takes place and the whole complex (plate 5, plate 10 and rim) begins to revolve. Due to the arrangement of the bars placed between the pair of rollers, the plate 5 draws the rim round without there being any slipping, even when the rim is being subjected to forces which tend to prevent it from moving. To release the rim, the rotation of the motor 2 is reversed to turn the plate 5 in the clockwise direction, causing arms 6, 7 and 8 to disengage the rim and return to a position extending along the radii from the center of rotation of plate 5.

Another special feature of the machine, is an arm 14 which can, by turning about a vertical axle T, be freely maneuvered so as to be able to act upon rims of any diameter without any adjustment of the machine.

At the end of the said arm 14 is fitted a small-vertical shaft F. This shaft, which has on its top end a ball-grip and at its lower end a special tool D, can slide freely along its own axis and can rotate.

The special tool D is a tapered cylinder with a conical head. It is very highly polished and of very hard material. To remove the tire from its respective rim, the following procedure is used. The wheel is laid on the gripping-platform 6, being integrated with it by rotation of the plate 5 via the motor. The special tool D is then brought to a point on the outside edge of the rim; with a hand-tool (such as a tire iron) the tire-edge is lifted and aligned with the special tool D, which is then introduced between the edge of the tire and the edge of the rim. Then the machine is set in motion thus turning the platform 6 together with the wheel and the tire. After one complete turn one wall of the tire is away from the rim. The same action applied to the other wall removes the tire completely from the rim. To replace the tire on its rim an analogous operation is used, though it is quicker since the process does not need to be initiated with a hand-tool.

What I claim:

1. In a device for separating a tire from a rim comprising a stationary clutch platform, a middle plate coaxial with said clutch platform and slidably mounted thereon, and a top plate coaxial with both said clutch plate and said middle plate, a plurality of arms pivotably attached at one end thereof to the periphery of said top plate and extending outwardly therefrom, each of said arms terminating in a hook-shaped end adapted to engage the rim of said tire, a like plurality of roller pairs mounted on said middle plate, each of said roller pairs being associated with a respective arm and positioned so that the rollers of each pair are astraddle each of said arms and extending upwardly from said middle plate in engaging relationship to its respective arm, and means to rotatably drive said top plate when a tire is mounted thereon to rotate said top plate relative to said middle plate as said middle plate is restrained by the frictional drag of said clutch plate thereby to pivot said arms about their pivot points and to bring the hook-shaped ends thereof into gripping engagement with the rim of said tire and thereafter to rotate said tire with the rotation of said top plate.

2. In a device in accordance with claim 1 in which said plurality of arms comprises three arms.

3. In a device in accordance with claim 1 which includes a tool arm pivotably mounted at one end thereof on a vertical axis displaced from said rotating top plate, a tool mounted at the other end of said tool arm, said tool arm being adapted for insertion between said tire and said rim to facilitate removal of said tire from said rim as said rim is drivingly rotated.

4. In a device in accordance with claim 1 which includes means for reversing the rotation of said driven top plate to release the engagement of said arms from said rim.

References Cited by the Examiner
UNITED STATES PATENTS

| | | |
|---|---|---|
| 1,751,023 | 3/1930 | Aune. |
| 2,564,069 | 8/1951 | Kistler _____ 157—1.1 |
| 2,569,788 | 10/1951 | Weaver _____ 157—1.24 |
| 2,777,507 | 1/1957 | Branick _____ 157—1.24 X |

FRANK E. BAILEY, *Primary Examiner.*

GRANVILLE Y. CUSTER, JR., *Examiner.*